United States Patent
Hoag et al.

(10) Patent No.: US 7,844,521 B1
(45) Date of Patent: Nov. 30, 2010

(54) METHOD AND SYSTEM FOR PROVIDING SELLERS ACCESS TO BUSINESS MANAGING CONSUMERS

(75) Inventors: Didrik Hoag, San Carlos, CA (US); James Robert Del Favero, Mountain View, CA (US); Benjamin Weiss, Portola Valley, CA (US)

(73) Assignee: Intuit Inc., Mountain View, CA (US)

( * ) Notice: Subject to any disclaimer, the term of this patent is extended or adjusted under 35 U.S.C. 154(b) by 94 days.

(21) Appl. No.: 11/867,892

(22) Filed: Oct. 5, 2007

(51) Int. Cl.
*G06Q 40/00* (2006.01)

(52) U.S. Cl. .................................................. 705/35
(58) Field of Classification Search .............. 705/35–42
See application file for complete search history.

(56) References Cited

U.S. PATENT DOCUMENTS

| | | | |
|---|---|---|---|
| 7,469,224 B2 * | 12/2008 | Foss, Jr. ........................ | 705/35 |
| 2003/0233339 A1 * | 12/2003 | Downs ........................... | 707/1 |
| 2004/0236653 A1 * | 11/2004 | Sokolic et al. ................. | 705/35 |
| 2005/0187867 A1 * | 8/2005 | Sokolic et al. ................. | 705/39 |
| 2005/0197954 A1 * | 9/2005 | Maitland et al. .............. | 705/39 |
| 2006/0149648 A1 * | 7/2006 | Brown ........................... | 705/35 |
| 2008/0208735 A1 * | 8/2008 | Balet et al. .................... | 705/39 |
| 2008/0301016 A1 * | 12/2008 | Durvasula et al. ............. | 705/35 |

OTHER PUBLICATIONS

Fineberg, Seth, "QuickBooks could get boost from Intuit's pact with HP", Accounting Today. New York: Apr. 19-May 2, 2004. vol. 18, Iss. 7; p. 22, 2 pgs.*
Business Editors, "Quicken.com to offer infoUSA Databases on its Web Site", Business Wire. New York: Jan. 28, 1999. p. 1.*
Bow, David H., "How to Win Small Business Clients", Bank Administration. Rolling Meadows: Jan. 1987. vol. 63, iss 1; p. 35, 3 pgs.*
Hu, Xiaohua, "A Data Mining Approach for Retailing Bank Customer Attrition Analysis", College of Information Science, Drexel University, Philadelphia, PA, USA 19104, c. 2005.*

* cited by examiner

*Primary Examiner*—Ella Colbert
*Assistant Examiner*—Mohammad Z Shaikh
(74) *Attorney, Agent, or Firm*—Gunnison, McKay & Hodgson, L.L.P.; Philip McKay

(57) ABSTRACT

A method and system for identifying business managing consumers includes a process for identifying business managing consumers whereby financial transaction data for various consumers is obtained from one or more sources using a computing system implemented financial management system. The consumers' financial transaction data is then analyzed to identify financial transactions typically associated with ownership and/or management of a business, i.e., business management related transactions. If more than a defined threshold number of business management related transactions associated with a given consumer are identified, that consumer is categorized as a business managing consumer. Sellers of business related products and/or service are then given access to the identified business managing consumers for promoting their various business related products and services.

18 Claims, 2 Drawing Sheets

METHOD AND SYSTEM FOR PROVIDING SELLERS ACCESS TO BUSINESS MANAGING CONSUMERS

BACKGROUND

Advertising and marketing represents a significant ongoing expense for most sellers and/or providers of consumer goods and services. Herein sellers and/or providers of consumer goods and services are referred to collectively as "sellers". In order to most efficiently use their marketing and/or advertising resources, most sellers would prefer to access and/or advertise to consumers having attributes that are particularly desirable to the seller and/or make the seller's product and/or service particularly applicable to the consumer. For instance, a seller of business related products may be particularly interested in targeting consumers who own, operate, and/or are associated with the management of a business. Herein, consumers that own, operate, and/or are associated with the management of a business are collectively referred to as "business managing consumers".

Traditionally, sellers were typically made aware that a consumer might be an owner, operator and/or manager of a business through the business itself, i.e., the sellers accessed the business managing consumers by contacting the business. However, with the event of electronic commerce, numerous small and/or home based businesses have arisen. As a result, many traditional methods for determining that a given business managing consumer might be an owner, operator and/or manager of a business, and/or avenues for accessing business managing consumers, are often no longer available.

The situation discussed above is not only problematic for the seller, but the business managing consumers are also deprived the opportunity to receive special offers, pricing, discounts, and products that are often available to them by virtue of there business managing consumer status.

Despite the potential advantages to both sellers and business managing consumers of identifying business managing consumers, there currently is often no information, or not complete enough information, available to the seller to accurately identify a given consumer as a business managing consumer. In addition, even in the few cases where the limited information about a given consumer is available, the information is typically obtained from a single source, such as transactional data associated with a single credit card account, and is therefore incomplete, and the information is typically only available to larger retailers, advertisers and other sellers, such as the retailer offering the credit card account that is the single source of information.

As noted above, as a result of the situation discussed above, not only are sellers of business related goods and services denied the ability to identify and target particularly desirable business managing consumers for distribution of offers, but the desirable business managing consumers are also denied savings that would otherwise be provided to them through the discounts and/or products that would be offered to them, if the information were available to identify them. Consequently, the current situation represents a disservice to both sellers and business managing consumers.

SUMMARY

In accordance with one embodiment, a method and system for identifying business managing consumers includes a process for identifying business managing consumers whereby, in one embodiment, financial transaction data for various consumers is obtained from one or more sources, in one embodiment, using a computing system implemented financial management system. In one embodiment, the consumers' financial transaction data is then analyzed to identify financial transactions typically associated with ownership and/or management of a business, i.e., business management related transactions. In one embodiment, if more than a threshold number of business management related transactions associated with a given consumer are identified, that consumer is categorized as a business managing consumer. In one embodiment, the sellers are then given access to the identified business managing consumers for promoting their various business related products and services.

In one embodiment, access to the data representing the financial transaction data for various consumers is obtained through a computing system implemented financial management system that implements, includes, is accessible by, and/or is otherwise associated with the process for identifying business managing consumers. Herein, a computing system implemented financial management system can be, but is not limited to, any of the following: a computing system implemented personal financial management system; a computing system implemented home inventory system; a computing system implemented personal asset management system; a computing system implemented personal accounting system; a computing system implemented tax preparation system; and/or any of the numerous computing system implemented financial management systems known to those of skill in the art.

Current computing system implemented financial management systems are typically software applications which, along with a parent computing system or device, help consumers/users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, computing system implemented financial management systems typically obtain financial transaction information, such as payee identification, payee location, payment amount, date of the transaction, time of transaction, etc., via communication with banks, credit card providers, or other financial institutions, using data entry, links to databases, and electronic data transfer systems such as the Open Financial Exchange (OFX) specification, Web Direct, or various systems for transferring financial transaction data.

Using computing system implemented financial management systems, the financial transaction information, payee identification, payee location, payment amount, date of the transaction, various tags and/or labels, and other data is often used by the computing system implemented financial management system to categorize and/or tag individual financial transactions as a particular type of income or expense, to generate various financial reports, and to create an overview of the consumer's financial situation based on input from multiple, and often all, available sources of financial information regarding a given consumer. Some currently offered computing system implemented financial management systems then use this financial transaction information to track events, such as purchase events, and to provide various historical personal and business data reports or displays including "to date" data reports, such as historical spending data reports in one or more particular categories and/or tagging schemes, as well as year-end personal and business tax reports.

In one embodiment, the consumers' financial transaction data, as collected, and/or tagged, and/or categorized by the computing system implemented financial management system is then analyzed by the process for identifying business managing consumers to identify financial transactions typically associated with ownership and/or management of a business, i.e., typical business management related transactions.

In one embodiment, a threshold number of business management related transactions is defined. In one embodiment, the threshold number of business management related transactions is defined as one or more business management related transactions. In other embodiments, a greater number of business management related transactions is defined as the threshold number. In one embodiment, if more than the defined threshold number of business management related transactions associated with a given consumer are identified by the process for identifying business managing consumers, that consumer is categorized as a business managing consumer by process for identifying business managing consumers.

In one embodiment, sellers are then given access to the business managing consumers identified by the process for identifying business managing consumers for promoting their various business related products and services.

In one embodiment, the provider of the computing system implemented financial management system used to obtain the consumers financial data is a provider of marketing and advertising tools and/or the user of process for identifying business managing consumers. In this instance, in one embodiment, the provider of the financial management system used to obtain the consumers financial data provides the seller, or himself, advertisement space and/or access to the business managing consumer, within the consumers account in the computing system implemented financial management system and, in one embodiment, on the consumer's desktop, based, at least in part, on the analysis of the consumer's financial transaction data and the identification of the consumer as a business managing consumer by the process for identifying business managing consumers.

In one embodiment, an owner of a website is a provider of marketing and advertising tools and/or the user of the process for identifying business managing consumers. In this instance, in one embodiment, the website owner provides the seller, or himself, advertisement space and/or access to the business managing consumer within the website in a business managing consumers account on the website based, at least in part, on the analysis of the consumer's financial transaction data and the identification of the consumer as a business managing consumer by the process for identifying business managing consumers.

In one embodiment, an owner of a search engine is a provider of marketing and advertising tools and/or the user of the process for identifying business managing consumers. In this instance, in one embodiment, the search engine owner provides the seller, or himself, advertisement space and/or access to the business managing consumer within the search engine results section based, at least in part, on the analysis of the consumer's financial transaction data and the identification of the consumer as a business managing consumer by the process for identifying business managing consumers.

Using the method and system for identifying business managing consumers disclosed herein, a consumer's financial transaction data is used to identify a given consumer as a business managing consumer. One or more sellers and/or providers of business related products are then given access to that consumer. This is advantageous to the seller, since the seller is provided access to these desirable consumers, and the business managing consumers, since they are provided offers directly related to their status as a business manager and/or owner.

As discussed in more detail below, using the below embodiments, with little or no modification and/or user input, there is considerable flexibility, adaptability, and opportunity for customization to meet the specific needs of various users under numerous circumstances.

Figure 1:
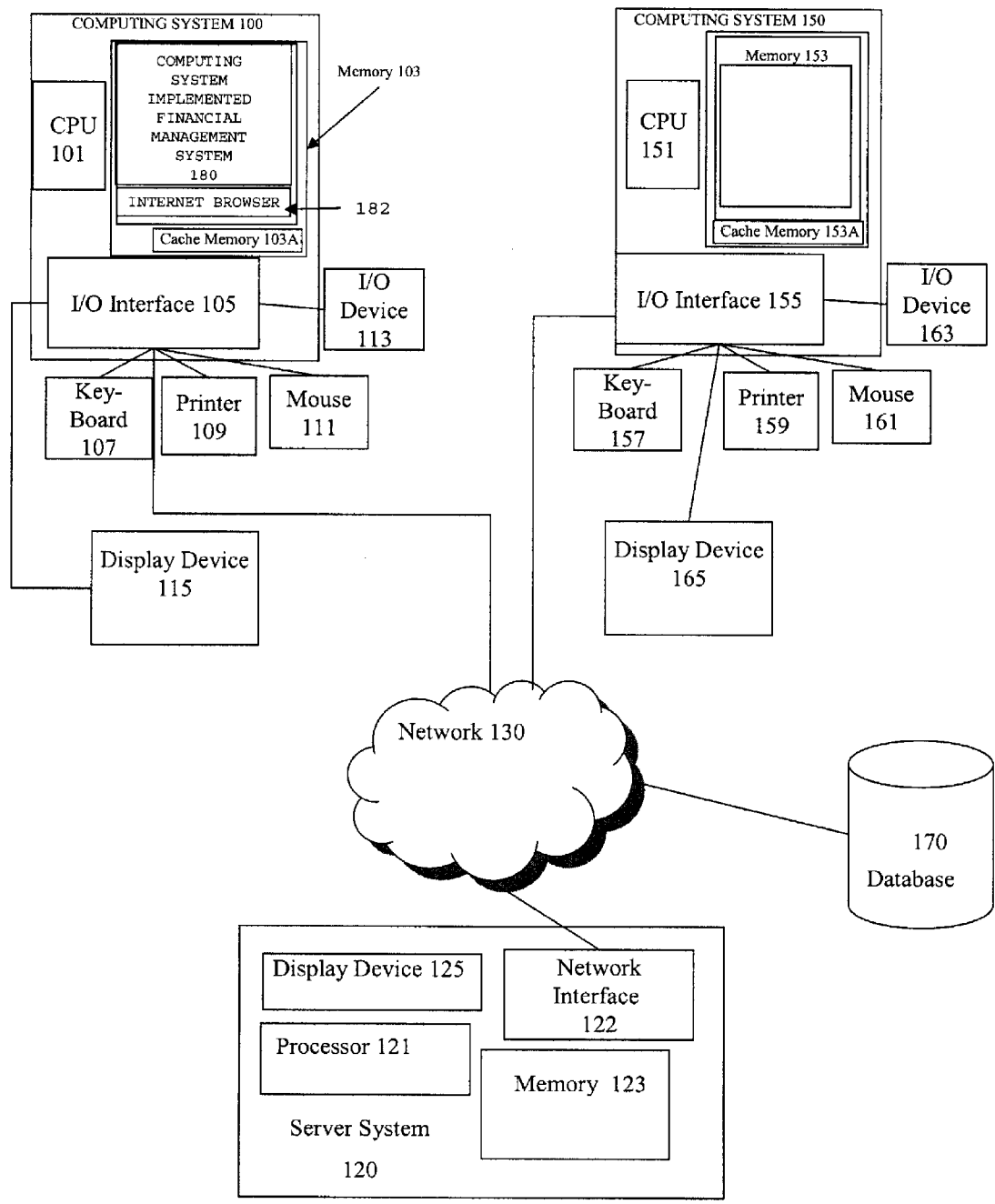
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

For illustrative purposes, some embodiments are described herein within the framework of, and using, one or more computing system implemented financial management systems. Various specific details are discussed below, and shown in the accompanying FIG.s, to aid one of skill in the art in understanding the invention. However, such specific details are intended to be illustrative only, and are not intended to restrict in any way the scope as claimed herein. In addition, the particular terminology used herein is intended to be illustrative and exemplary only, and in no way limits the scope as claimed.

Some embodiments are implemented in a computing system including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing system, whether known at the time of filing or as developed later. Some embodiments are implemented in a mobile computing system running mobile operating systems such as Symbian® OS, Windows® Mobile, or any other operating system designed to generally manage operations on a mobile computing system, whether known at the time of filing or as developed later. As described more fully below, embodiments can be implemented on computing systems other than a conventional computing system such as, for example, a personal digital assistant, a cell phone, or other computing system capable of processing computer readable data, whether known at the time of filing or as developed later. Computing systems also include those in which one or more computing resources (hardware or software) are located remotely and accessed via network, such as a Local Area Network (LAN), Wide Area Network (WAN), a public network, such as the Internet, a private network, a combination of network types, a computing system bus, or other electronic medium in which data may be exchanged between one computing system and one or more other computing system(s), whether known at the time of filing or as developed later. Embodiments may be included as add-on software for existing software programs, packages or applications, and embodiments may be a feature of an application that is bundled with a computing system or sold separately. Some embodiments may also be implemented as functionality embedded in hardware devices and systems.

Output generated by one or more embodiments can be displayed on a display screen, delivered from a website and/or web-based function, transmitted to a remote device, stored on any database, computer server or other storage mechanism, printed, or used in any other way. In addition, in some embodiments, processes and/or systems described herein may make use of input provided to the computer device implementing a process and/or application, discussed herein, via user interface devices such as a keyboard, mouse, touchpad, or any other device capable of providing user input to a computing system or for translating user actions into computing system operations, whether known at the time of filing or as developed later.

Hardware System Architecture

FIG. 1 is a block diagram of an exemplary hardware architecture for implementing one embodiment of a system and method for identifying business managing consumers, such as exemplary process 200 discussed herein, that includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a computing system implemented financial management system 180 such as, but not limited to: a computing system implemented personal financial management system; a computing system implemented personal accounting system; a computing system implemented tax preparation system; a computing system implemented healthcare management system; or any other computing system implemented data management system. In one embodiment, computing system implemented financial management system 180 is stored, in whole, or in part, in memory system 103, and is used by, or includes, as discussed below, a process for identifying business managing consumers, such as exemplary process 200 discussed below.

Computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for identifying business managing consumers and/or a computing system implemented financial management system is entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser and/or access capability 182 that, in one embodiment, is stored, in whole, or in part in memory 103.

In one embodiment, computing system 100 is a computing system accessible by a seller and/or a provider of marketing and advertising tools and/or a consumer and is used and/or accessible by another computing system, such as computing system 150 (discussed below), a workstation, a two-way pager, a cellular telephone, a smart phone, a digital wireless telephone, a Personal Digital Assistant (PDA), a server computer, an Internet appliance, any other device, or any desired combination of these devices, that includes components that can execute all, or part, of a process for identifying business managing consumers, and/or a computing system implemented financial management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 is accessible by a seller and/or a provider of marketing and advertising tools and, in one embodiment, memory system 153 includes all, or part of, data representing one or more consumers and/or their associated financial transaction data, such as discussed below.

As discussed in more detail below, in one embodiment, all, or part of, a process for identifying business managing consumers, and/or a computing system implemented financial management system, can also be loaded, in whole, or in part, into computing system 150 from computing system 100 for storage in memory system 153 and/or cache memory 153A.

Also shown in FIG. 1 is exemplary database 170. In one embodiment, database 170 is a data storage device, a designated server system or computing system, or a designated portion of one or more server systems or computing systems, such as computing systems 100, 150 and 120, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of the consumer, and/or the consumer's agents, one or more sellers and/or providers of marketing and advertising tools, and/or a process for identifying business managing consumers, such as exemplary process 200, and/or a computing system implemented process, such as a computing system implemented financial management system 180.

In one embodiment, database 170 is used, controlled, and/or accessible by, a provider of and/or a system and process for identifying business managing consumers, such as process for identifying business managing consumers 200, and data representing all, or part, of a consumer's financial data is stored in database 170, typically in accounts associated with a given consumer. In one embodiment, database 170 is used, controlled, and/or accessible by, a provider of and/or a computing system implemented financial management system, such as a computing system implemented financial management system 180, and data representing all, or part, of a consumer's financial data is stored in database 170, typically in accounts associated with a given consumer. In one embodiment, database 170 is used, controlled, and/or accessible by, one or more sellers and/or providers of marketing and advertising tools.

In one embodiment, computing systems 100 and 150, and database 170, are coupled to a server system 120 through network 130. In one embodiment, server system 120 typically includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, server system 120 is used, controlled, and/or accessible by, a provider of and/or a system and process for identifying business managing consumers, such as process for identifying business managing consumers 200, and data representing all, or part, of a consumer's financial data is stored in server system 120, typically in accounts associated with a given consumer. In one embodiment, server system 120 is used, controlled, and/or accessible by, a provider of and/or a computing system implemented financial management system, such as a computing system implemented financial management system 180, and data representing all, or part, of a consumer's financial data is stored in server system 120, typically in accounts associated with a given consumer. In one embodiment, server system 120 is used, controlled, and/or accessible by, one or more sellers and/or providers of marketing and advertising tools.

Network 130 can be any network or network system that is of interest to a user such as, a peer-to-peer network, a hybrid peer-to-peer network, a Local Area Network (LAN), a Wide Area Network (WAN), a public network, such as the Internet, a private network, a combination of different network types, or other wireless, wired, and/or a wireless and wired combination network capable of allowing communication between two or more computing systems, whether available or known at the time of filing or as later developed.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network, as discussed herein. In addition, the particular type of, and configuration of, computing systems 100 and 150, database 170, and server system 120 are not relevant.

As discussed in more detail below, in one embodiment, a process for identifying business managing consumers, such as process for identifying business managing consumers 200, and/or a computing system implemented financial management system, such as a computing system implemented financial management system 180, and/or data representing one or more consumers' financial transaction data, are stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for identifying business managing consumers, such as process for identifying business managing consumers 200, and/or a computing system implemented financial management system, such as computing system implemented financial management system 180, are sometimes referred to herein, alternatively, as a process, an application, a module, a program, a component of a software system, a component of a software package, a component of a parent system, a plug-in, or a feature of a parent system, this terminology is illustrative only. In some embodiments, a process for identifying business managing consumers, such as process for identifying business managing consumers 200, and/or a computing system implemented financial management system, such as a computing system implemented financial management system 180, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for identifying business managing consumers, such as process for identifying business managing consumers 200, and/or a computing system implemented financial management system, such as a computing system implemented financial management system 180, and/or data representing the one or more consumers and/or their associated financial transaction data, such as discussed below, are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

For example, all, or part, of a process for identifying business managing consumers, such as process for identifying business managing consumers 200, and/or a computing system implemented financial management system, such as a computing system implemented financial management system 180, and/or data representing the one or more consumers and/or their associated financial transaction data, may be stored in a memory that is physically located in a location, such as server system memory 123, or database 170, of FIG.

1, different from a computing system, such as computing systems 100 and/or 150 of FIG. 1, utilizing a process for identifying business managing consumers, and/or a computing system implemented financial management system, and/or data representing the one or more consumers and/or their associated financial transaction data, such as discussed below. In one embodiment, all, or part, of a process for identifying business managing consumers, and/or a computing system implemented financial management system, and/or data representing one or more consumers' financial transaction data, may be stored in a memory that is physically located, separate from the computing system's processor(s), such as CPUs 101 and 151 of FIG. 1, and the computing system CPUs can be coupled to the memory in a client-server system, such as server system 120 of FIG. 1, or, alternatively, via connection to another computer, such as computing systems 100, 150 of FIG. 1, via modems and analog lines, digital interfaces and a digital carrier line, or wireless or cellular connections.

In one embodiment, the computing systems and/or server systems, such as computing systems 100 and/or 150 and/or server system 120 of FIG. 1, running and/or utilizing and/or storing all, or part, of a process for identifying business managing consumers, such as process for identifying business managing consumers 200, and/or a computing system implemented financial management system, such as a computing system implemented financial management system 180, and/or data representing the one or more consumers and/or their associated financial transaction data, such as discussed below, is a portable computer, a workstation, a two-way pager, a cellular telephone, a smart phone, a digital wireless telephone, a PDA, a server computer, an Internet appliance, or any other device that includes components that can execute all, or part, of a process for identifying business managing consumers, and/or a computing system implemented financial management system, in accordance with at least one of the embodiments as described herein. Similarly, in another embodiment, a process for identifying business managing consumers, and/or a computing system implemented financial management system, and/or data representing the one or more consumers and/or their associated financial transaction data, may be implemented on, and/or run, and/or stored on, a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Process

Herein, the terms "consumer", "individual", "user", and/or "customer" are used interchangeably to denote any party that a seller wishes to access using a process for identifying business managing consumers, and/or a person who is the subject of, source of, and/or target of, all, or part of, any data/information obtained and/or analysis performed by a process for identifying business managing consumers, and/or a legal guardian of a person who is the subject of, and/or target of, any data/information obtained and/or analysis performed by a process for identifying business managing consumers, and/or an authorized agent of any party that a seller wishes to access using a process for identifying business managing consumers, and/or a person who is the subject of, and/or target of, any information obtained and/or analysis performed, by a process for identifying business managing consumers, and/or any other authorized party associated with any party that a seller wishes to access using a process for identifying business managing consumers, and/or a person who is the subject of, and/or target of, any information obtained and/or analysis performed by a process for identifying business managing consumers.

As used herein, the term seller includes, but is not limited to: a provider of goods; a provider of services; a party desiring to access a consumer; or any other entity desiring to access a consumer.

As used herein, a provider of marketing and advertising tools is any party offering and/or providing a seller access to a consumer.

As used herein, the term computing system implemented financial management system includes, but is not limited to: computing system implemented personal financial management systems, packages, programs, modules, or applications; computing system implemented tax preparation systems, packages, programs, modules, or applications; computing system implemented accounting and/or invoicing systems, packages, programs, modules, or applications; and various other electronic data management systems, packages, programs, modules, or applications, whether known at the time of filling or as developed later.

In accordance with one embodiment, a method and system for identifying business managing consumers includes a process for identifying business managing consumers whereby, in one embodiment, financial transaction data for various consumers is obtained from one or more sources, in one embodiment, using a computing system implemented financial management system. In one embodiment, the consumers' financial transaction data is then analyzed to identify financial transactions typically associated with ownership and/or management of a business, i.e., business management related transactions. In one embodiment, if more than a threshold number of business management related transactions associated with a given consumer are identified, that consumer is categorized as a business managing consumer. In one embodiment, the sellers are then given access to the identified business managing consumers for promoting their various business related products and services.

Figure 2:
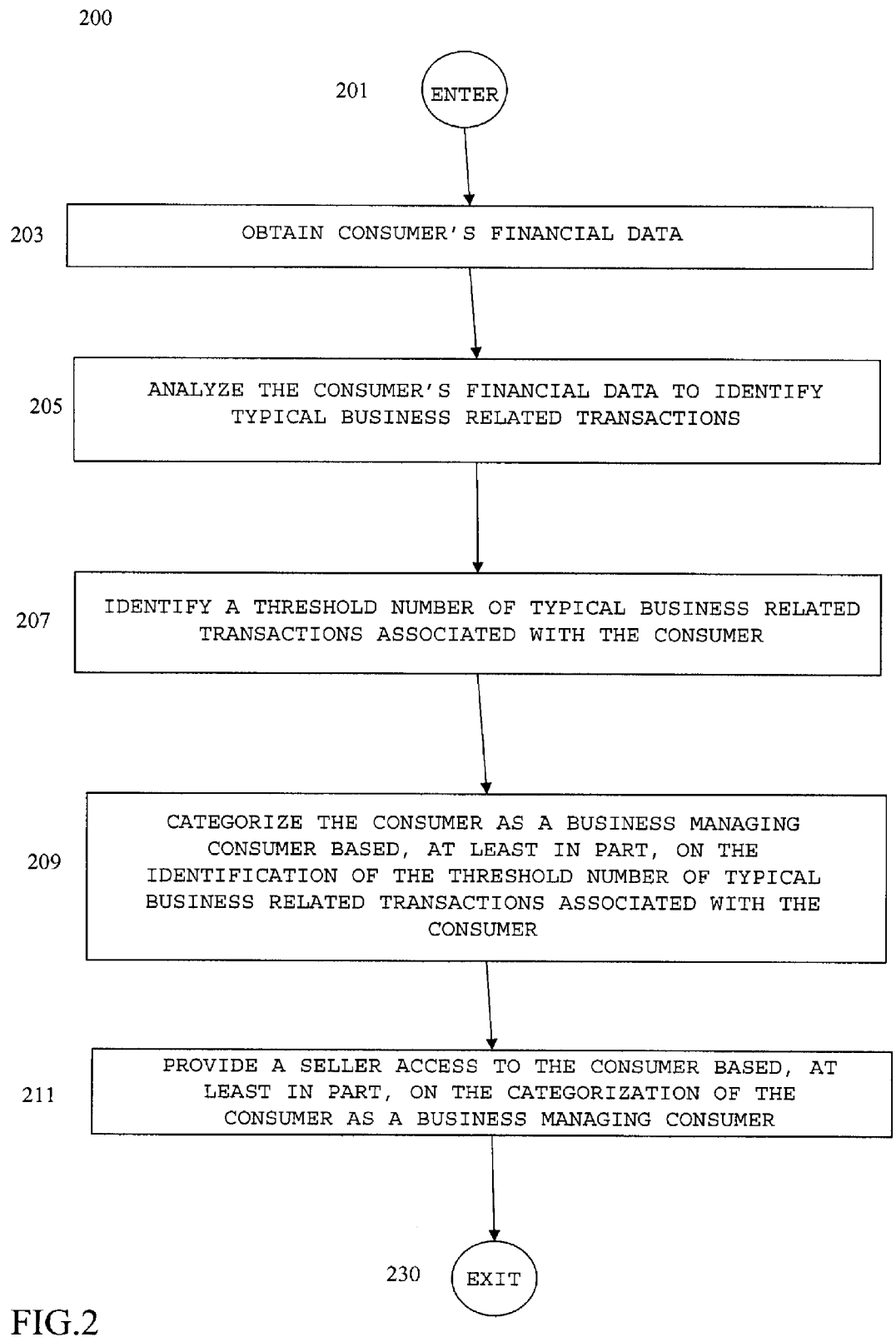
FIG. 2 is a flow chart depicting a process for identifying business managing consumers in accordance with one embodiment.

FIG. 2 a flow chart depicting a process for identifying business managing consumers 200 in accordance with one embodiment. Process for identifying business managing consumers 200 begins at ENTER OPERATION 201 of FIG. 2 and process flow proceeds to OBTAIN CONSUMER'S FINANCIAL DATA OPERATION 203.

In one embodiment, at OBTAIN CONSUMER'S FINANCIAL DATA OPERATION 203 financial data representing various financial transactions conducted by a given consumer is obtained by process for identifying business managing consumers 200 using, and/or through, and/or from, a computing system implemented financial management system.

In one embodiment, the data representing financial transactions conducted by a given consumer obtained at OBTAIN CONSUMER'S FINANCIAL DATA OPERATION 203 includes data associated with financial transactions conducted using multiple payment methods and/or accounts to provide as complete a set of consumer financial data as possible. For instance, in one embodiment, the consumer's financial transaction data is obtained at OBTAIN CONSUMER'S FINANCIAL DATA OPERATION 203 from, but not limited to, any one or more of the following sources: banks; debit cards and/or accounts; credit unions; credit cards and/or accounts and/or credit card/account providers; asset accounts and/or asset account providers; or other financial resources, accounts and/or services used by a consumer to pay for and/or conduct financial transactions.

In addition, in some embodiments, the consumer's financial transaction data obtained at OBTAIN CONSUMER'S FINANCIAL DATA OPERATION 203 is obtained from multiple sources of the same type. For instance, in one embodiment, the consumer's financial transaction data is obtained at OBTAIN CONSUMER'S FINANCIAL DATA OPERATION 203 from: two or more banks; two or more debit cards and/or accounts; two or more credit unions; two or more credit cards and/or accounts and/or credit card/account providers; two or more asset accounts and/or asset account providers; and/or two or more other financial resources, accounts and/or services used by a consumer to pay for and/or conduct financial transactions.

As noted above, in one embodiment, all, or part, of the consumer's financial transaction data is obtained by process for identifying business managing consumers 200 at OBTAIN CONSUMER'S FINANCIAL DATA OPERATION 203 from, or using, a computing system implemented financial management system, such as computing system implemented financial management system 180, that implements, includes, is accessed by, and/or is otherwise associated with process for identifying business managing consumers 200 (FIG. 2).

Currently, various computing system implemented financial management systems are available including, but not limited to: computing system implemented personal financial management systems; computing system implemented home inventory systems; computing system implemented tax preparation systems; computing system implemented accounting systems; and computing system implemented medical expense management systems; as well as various other electronic data driven financial management systems.

Computing system implemented financial management systems typically help consumers/users manage their finances by providing a centralized interface with banks, credit card companies, and other various financial institutions and/or accounts, for identifying, processing, tagging, storing, and categorizing consumer financial transactions and other consumer financial data. Currently, computing system implemented financial management systems typically obtain financial transaction information, such as payee identification, payee location, payment amount, date of the transaction, time of transaction, items purchased, the type of transaction, etc., via communication with banks, credit card providers, or other financial institutions, using electronic data transfer systems such as the Open Financial Exchange (OFX) specification, Web Direct, or various other systems for transferring financial transaction data.

As noted above, using computing system implemented financial management systems, the financial transaction information, payee identification, payee location, payment amount, date of the transaction, tags, flags, and other data is often used by the computing system implemented financial management system to categorize and/or tag and/of flag individual financial transactions as a particular type of income or expense and/or as business related expenses. Some currently offered computing system implemented financial management systems then use this financial transaction information to track events, such as purchase events, and to provide various historical business and/or personal data reports or displays including "to date" data reports, such as historical spending data reports, in one or more particular categories, and/or personal and/or business related tax reports.

In one embodiment, the consumer's financial transaction data obtained using one or more computing system implemented financial management systems is transferred, or otherwise made available to, process for identifying business managing consumers 200 at OBTAIN CONSUMER'S FINANCIAL DATA OPERATION 203.

In one embodiment, all, or part, of the consumer's financial transaction data is obtained by process for identifying business managing consumers 200 at OBTAIN CONSUMER'S FINANCIAL DATA OPERATION 203 from invoices/bills and/or receipt data provided to process for identifying business managing consumers 200, and/or an associated computing system implemented financial management system, by one or more merchants and/or product and/or service providers. In one embodiment, the invoice/bill and/or receipt data includes "level 3" data indicating, among other things, the line item entry and product and/or service identification for each item purchased in the transaction.

As noted above, in one embodiment, process for identifying business managing consumers 200 is associated with a computing system implemented financial management system, such as computing system implemented financial management system 180 of FIG. 1, that implements, includes, is accessed by, and/or is otherwise associated with process for identifying business managing consumers 200 (FIG. 2). Some of these computing system implemented financial management systems provide the capability to obtain, receive, and/or process electronic copies of the invoices/receipts from one or more merchants and/or product and/or service providers, often in their specific formats, and then store the data for use by process for identifying business managing consumers 200 in one of numerous locations by one of numerous methods known to those of skill in the art and/or as discussed herein.

In one embodiment, all, or part, of the consumer's financial transaction data is obtained by process for identifying business managing consumers 200, and/or a computing system implemented financial management system, at OBTAIN CONSUMER'S FINANCIAL DATA OPERATION 203 from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a consumer to pay for and/or conduct financial transactions.

In one embodiment, all, or part, of the consumer's financial transaction data is obtained by process for identifying business managing consumers 200 at OBTAIN CONSUMER'S FINANCIAL DATA OPERATION 203 from user input through a user interface device such as keyboard 107, 157, mouse 111, 161 of FIG. 1 or a touchpad, voice command recognition system, or any other device capable of providing user input to a computing system or for translating user actions into computing system operations, whether available or known at the time of filing or as developed later.

Returning to FIG. 2, in one embodiment, all, or part, of the consumer's financial transaction data is obtained by process for identifying business managing consumers 200 at OBTAIN CONSUMER'S FINANCIAL DATA OPERATION 203 from any combination of the above sources and/or from any other source of a consumer's financial data whether known at the time of filing or as developed thereafter.

In one embodiment, once the consumer's financial data is obtained at OBTAIN CONSUMER'S FINANCIAL DATA OPERATION 203, the data is stored in whole, or in part, in a database maintained by, accessible by, owned by, or otherwise related to: process for identifying business managing consumers 200, and/or a provider of process for identifying business managing consumers 200; a computing system implemented financial management system, and/or a provider of a computing system implemented financial management system; one or more sellers; or any other party, by any one of the numerous mechanisms known to those of skill in the art. For instance, in one embodiment, the data, in whole, or in part, is stored in a memory system, such as memory systems 103 and 153 or server memory system 123, or database 170, of FIG. 1, or in a cache memory, such as cache memories 103A/153A of FIG. 1, or in any main memory or mass memory, associated with a computing system, such as computing systems 100 or 150 described above. In one embodiment, the data, in whole, or in part, is stored in any computing system and/or server system, such as computing systems 100 or 150 or server system 120, or other device, in another location, or on/in a computer readable medium, and/or any other computer program product, as defined herein. In one embodiment, the data, in whole, or in part, is stored on a webpage, in a web-based system or on a public network such as the Internet.

Returning to FIG. 2, in some embodiments, the consumer's financial data stored as described above is maintained, in whole, or in part, by: process for identifying business managing consumers 200, and/or a provider of process for identifying business managing consumers 200; a computing system implemented financial management system, and/or a provider of a computing system implemented financial management system; one or more providers of marketing and advertising tools; a third party data storage institution; any third party service or institution; or any other parties. In these embodiments, access to the consumer's financial data is then provided to process for identifying business managing consumers 200, and/or a computing system implemented financial management system, by providing access to the data and/or providing the data on a computer program product.

In one embodiment, once financial data representing various financial transactions conducted by a given consumer is obtained by process for identifying business managing consumers 200 using/from a computing system implemented financial management system at OBTAIN CONSUMER'S FINANCIAL DATA OPERATION 203, process flow proceeds to ANALYZE THE CONSUMER'S FINANCIAL DATA TO IDENTIFY TYPICAL BUSINESS RELATED TRANSACTIONS OPERATION 205.

In one embodiment, at ANALYZE THE CONSUMER'S FINANCIAL DATA TO IDENTIFY TYPICAL BUSINESS RELATED TRANSACTIONS OPERATION 205 the consumer's financial data obtained at OBTAIN CONSUMER'S FINANCIAL DATA OPERATION 203 is analyzed to identify financial transactions and or data that are typically associated with the ownership, operation and/or management of a business, and/or to categorize consumers based, at least in part, on the consumer's financial transaction data, as consumers that manage, own and/or operate a business, i.e., business managing consumers.

As discussed above, using computing system implemented financial management systems, the financial transaction data, payee identification, payee location, payment amount, date of the transaction, tags, flags, and other data is often used by the computing system implemented financial management system to categorize and/or tag and/of flag individual financial transactions as a particular type of income or expense and, in particular, in some cases as business related expenses. In these instances at ANALYZE THE CONSUMER'S FINANCIAL DATA TO IDENTIFY TYPICAL BUSINESS RELATED TRANSACTIONS OPERATION 205 the consumer's financial data obtained at OBTAIN CONSUMER'S FINANCIAL DATA OPERATION 203 is analyzed and transactions categorized flagged, and/or tagged by, or through, the computing system implemented financial management system, as business expenses are identified by process for identifying business managing consumers 200 as business management related transactions. For instance, as one example, transactions tagged and/or categorized by, or through, the computing system implemented financial management system, as business expenses would be designated business related expenses. As another example, transactions tagged and/or categorized by, or through, the computing system implemented financial management system, as business tax expenses and/or credits, such as a schedule C or schedule K tax line identified items, would be designated business related expenses. As another example, any transactions identified by any party and/or means as business tax expenses and/or credits, such as a schedule C or schedule K tax line items, would be designated business related expenses.

As also discussed above, using computing system implemented financial management systems, the financial transaction data, payee identification, payee location, payment amount, date of the transaction, item purchased identification data, tags, flags, and other data is often used by the computing system implemented financial management system to categorize and/or tag and/or flag individual financial transactions as a particular type of income or expense. In these instances at ANALYZE THE CONSUMER'S FINANCIAL DATA TO IDENTIFY TYPICAL BUSINESS RELATED TRANSACTIONS OPERATION 205 the consumer's financial data obtained at OBTAIN CONSUMER'S FINANCIAL DATA OPERATION 203 is analyzed and information such as the payee identification, payee location, and/or payment amount is used to identify business management related transactions by process for identifying business managing consumers 200. For instance, a payee such as a business licensing agency or business association could indicate that the transaction is a business management related transaction. As another example, a payment to a wholesale distributor could indicate that the transaction is a business management related transaction. As yet another example, a large payment amount to supplier or an Internet based auction cite could also indicate that the transaction is a business management related transaction.

As another example, in one embodiment, at ANALYZE THE CONSUMER'S FINANCIAL DATA TO IDENTIFY TYPICAL BUSINESS RELATED TRANSACTIONS OPERATION 205 the consumers' financial data obtained at OBTAIN CONSUMER'S FINANCIAL DATA OPERATION 203 is analyzed to identify business managing consumers based on previous purchases and amounts spent in general, i.e., an analysis of the overall spending by a given consumer.

As another example, in one embodiment, at ANALYZE THE CONSUMER'S FINANCIAL DATA TO IDENTIFY TYPICAL BUSINESS RELATED TRANSACTIONS OPERATION 205 the consumers' financial data obtained at OBTAIN CONSUMER'S FINANCIAL DATA OPERATION 203 is analyzed to identify business managing consumers based on previous purchases from one or more identified product and/or service providers.

As another example, in one embodiment, at ANALYZE THE CONSUMER'S FINANCIAL DATA TO IDENTIFY TYPICAL BUSINESS RELATED TRANSACTIONS OPERATION 205 the consumers' financial data obtained at OBTAIN CONSUMER'S FINANCIAL DATA OPERATION 203 is analyzed to identify business managing consumers based on the consumer spending a defined threshold amount of money in a defined time frame in a specific category of store.

As another example, in one embodiment, at ANALYZE THE CONSUMER'S FINANCIAL DATA TO IDENTIFY TYPICAL BUSINESS RELATED TRANSACTIONS OPERATION 205 the consumers' financial data obtained at OBTAIN CONSUMER'S FINANCIAL DATA OPERATION 203 is analyzed to identify business managing consumers based on the consumer spending a defined threshold amount of money in a defined time frame on specific products and/or services.

As another example, in one embodiment, at ANALYZE THE CONSUMER'S FINANCIAL DATA TO IDENTIFY TYPICAL BUSINESS RELATED TRANSACTIONS OPERATION 205 the consumers' financial data obtained at OBTAIN CONSUMER'S FINANCIAL DATA OPERATION 203 is analyzed to identify business managing consumers based on the consumer shopping with a seller, or other identified product and/or service providers, a threshold number of times over a defined time frame.

As another example, in one embodiment, at ANALYZE THE CONSUMER'S FINANCIAL DATA TO IDENTIFY TYPICAL BUSINESS RELATED TRANSACTIONS OPERATION 205 the consumers' financial data obtained at OBTAIN CONSUMER'S FINANCIAL DATA OPERATION 203 is analyzed to identify business managing consumers based on the consumer shopping in a defined geographic location.

As another example, in one embodiment, at ANALYZE THE CONSUMER'S FINANCIAL DATA TO IDENTIFY TYPICAL BUSINESS RELATED TRANSACTIONS OPERATION 205 the consumers' financial data obtained at OBTAIN CONSUMER'S FINANCIAL DATA OPERATION 203 is analyzed to identify business managing consumers based on any other criteria desired/defined by the provider of process for identifying business managing consumers 200 and/or the provider and/or a computing system implemented financial management system associated with process for identifying business managing consumers 200.

The specific analysis, criteria and examples discussed above are but a few specific examples of possible ways that at ANALYZE THE CONSUMER'S FINANCIAL DATA TO IDENTIFY TYPICAL BUSINESS RELATED TRANSACTIONS OPERATION 205 the consumers' financial data obtained at OBTAIN CONSUMER'S FINANCIAL DATA OPERATION 203 is analyzed to identify business managing consumers. In other embodiments, any other analysis and/or criteria, or combination of data and/or criteria, considered desirable by the provider of process for identifying business managing consumers 200, and/or the provider and/or a computing system implemented financial management system associated with process for identifying business managing consumers 200, and/or a seller, and/or providers of marketing and advertising tools, can be defined at ANALYZE THE CONSUMER'S FINANCIAL DATA TO IDENTIFY TYPICAL BUSINESS RELATED TRANSACTIONS OPERATION 205 for designating a given transaction as a business management related transaction and/or a consumer as a business managing consumer by the provider of process for identifying business managing consumers 200. Consequently, the specific examples discussed above are illustrative only and do not limit the invention as claimed below.

In one embodiment, once the consumer's financial data obtained at OBTAIN CONSUMER'S FINANCIAL DATA OPERATION 203 is analyzed to identify financial transactions and or data that are typically associated with the ownership, operation and/or management of a business at ANALYZE THE CONSUMER'S FINANCIAL DATA TO IDENTIFY TYPICAL BUSINESS RELATED TRANSACTIONS OPERATION 205, process flow proceeds to IDENTIFY A THRESHOLD NUMBER OF TYPICAL BUSINESS RELATED TRANSACTIONS ASSOCIATED WITH THE CONSUMER OPERATION 207.

In one embodiment, at IDENTIFY A THRESHOLD NUMBER OF TYPICAL BUSINESS RELATED TRANSACTIONS ASSOCIATED WITH THE CONSUMER OPERATION 207 a threshold number of business management related transactions is defined. In one embodiment, the threshold number of business management related transactions is defined as one or more business management related transactions. In other embodiments, a greater number of business management related transactions is defined as the threshold number.

As discussed below, in one embodiment, if more than the defined threshold number of business management related transactions associated with a given consumer of ANALYZE THE CONSUMER'S FINANCIAL DATA TO IDENTIFY TYPICAL BUSINESS RELATED TRANSACTIONS OPERATION 205 are identified at IDENTIFY A THRESHOLD NUMBER OF TYPICAL BUSINESS RELATED TRANSACTIONS ASSOCIATED WITH THE CONSUMER OPERATION 207 by process for identifying business managing consumers 200, that consumer is categorized as a business managing consumer by process for identifying business managing consumers 200.

In one embodiment, once a threshold number of business management related transactions is defined and the defined threshold number of business management related transactions associated with a given consumer are identified at IDENTIFY A THRESHOLD NUMBER OF TYPICAL BUSINESS RELATED TRANSACTIONS ASSOCIATED WITH THE CONSUMER OPERATION 207, process flow proceeds to CATEGORIZE THE CONSUMER AS A BUSINESS MANAGING CONSUMER BASED, AT LEAST IN PART, ON THE IDENTIFICATION OF THE THRESHOLD NUMBER OF TYPICAL BUSINESS RELATED TRANSACTIONS ASSOCIATED WITH THE CONSUMER OPERATION 209.

In one embodiment, at CATEGORIZE THE CONSUMER AS A BUSINESS MANAGING CONSUMER BASED, AT LEAST IN PART, ON THE IDENTIFICATION OF THE THRESHOLD NUMBER OF TYPICAL BUSINESS RELATED TRANSACTIONS ASSOCIATED WITH THE CONSUMER OPERATION 209, based on the findings at IDENTIFY A THRESHOLD NUMBER OF TYPICAL BUSINESS RELATED TRANSACTIONS ASSOCIATED WITH THE CONSUMER OPERATION 207, the consumer of OBTAIN CONSUMER'S FINANCIAL DATA OPERATION 203 is categorized as a business managing consumer.

In one embodiment, the categorization of the consumer as a business managing consumer is determined to mean that the consumer is likely to own, operate, and/or be associated with the management of a business. Consequently, the consumer categorized at CATEGORIZE THE CONSUMER AS A BUSINESS MANAGING CONSUMER BASED, AT LEAST IN PART, ON THE IDENTIFICATION OF THE THRESHOLD NUMBER OF TYPICAL BUSINESS RELATED TRANSACTIONS ASSOCIATED WITH THE CONSUMER OPERATION 209 as a business managing consumer is determined to be a good candidate to receive offers, discounts and advertisements directed to business products and/or services.

In one embodiment, once the consumer is categorized as a business managing consumer at CATEGORIZE THE CONSUMER AS A BUSINESS MANAGING CONSUMER BASED, AT LEAST IN PART, ON THE IDENTIFICATION OF THE THRESHOLD NUMBER OF TYPICAL BUSINESS RELATED TRANSACTIONS ASSOCIATED WITH THE CONSUMER OPERATION 209, process flow can proceed to PROVIDE A SELLER ACCESS TO THE CONSUMER BASED, AT LEAST IN PART, ON THE CATEGORIZATION OF THE CONSUMER AS A BUSINESS MANAGING CONSUMER OPERATION 211.

In one embodiment, at PROVIDE A SELLER ACCESS TO THE CONSUMER BASED, AT LEAST IN PART, ON THE CATEGORIZATION OF THE CONSUMER AS A BUSINESS MANAGING CONSUMER OPERATION 211, one or more sellers are provided access to the consumer of CATEGORIZE THE CONSUMER AS A BUSINESS MANAGING CONSUMER BASED, AT LEAST IN PART, ON THE IDENTIFICATION OF THE THRESHOLD NUMBER OF TYPICAL BUSINESS RELATED TRANSACTIONS ASSOCIATED WITH THE CONSUMER OPERATION 209.

In one embodiment, at PROVIDE A SELLER ACCESS TO THE CONSUMER BASED, AT LEAST IN PART, ON THE CATEGORIZATION OF THE CONSUMER AS A BUSINESS MANAGING CONSUMER OPERATION 211, one or more sellers are provided access to the consumer of CATEGORIZE THE CONSUMER AS A BUSINESS MANAGING CONSUMER BASED, AT LEAST IN PART, ON THE IDENTIFICATION OF THE THRESHOLD NUMBER OF TYPICAL BUSINESS RELATED TRANSACTIONS ASSOCIATED WITH THE CONSUMER OPERATION 209 by providing the seller advertisement avenues and/or advertising space.

Traditionally, advertising has been done through printed media, visual media, television, radio, etc. In these instances, using process for identifying business managing consumers 200, at PROVIDE A SELLER ACCESS TO THE CONSUMER BASED, AT LEAST IN PART, ON THE CATEGORIZATION OF THE CONSUMER AS A BUSINESS MANAGING CONSUMER OPERATION 211 the seller is provided and/or charged for access to various consumers based, at least in part, on the categorization of the consumer as a business managing consumer at CATEGORIZE THE CONSUMER AS A BUSINESS MANAGING CONSUMER BASED, AT LEAST IN PART, ON THE IDENTIFICATION OF THE THRESHOLD NUMBER OF TYPICAL BUSINESS RELATED TRANSACTIONS ASSOCIATED WITH THE CONSUMER OPERATION 209.

With the advent of the Internet and electronic commerce, several new avenues for accessing consumers have also been opened, including general and content-based advertising, typically on websites, computing system applications, and Internet search engines. Currently, some providers of computing system implemented applications, search engines, and/or websites offer sellers of consumer goods and services the opportunity to place advertisements at strategic locations within the applications and/or websites.

In some cases, these advertisements appear based on content and/or other criteria. In addition, in some instances, sellers of consumer goods and services are charged based on the number of potential customers that view the sellers advertise and/or link or "click" to the sellers website.

In one embodiment, the provider of the computing system implemented financial management system used to obtain the consumers financial data at OBTAIN CONSUMER'S FINANCIAL DATA OPERATION 203 is a provider of marketing and advertising tools and/or the user of process for identifying business managing consumers. In this instance, in one embodiment, the provider of the financial management system used to obtain the consumers financial data provides the seller, or himself, advertisement space and/or access to the business managing consumer, in one embodiment within the consumers account in the computing system implemented financial management system and, in one embodiment, on the consumer's desktop. In these instances, in some embodiments, at PROVIDE A SELLER ACCESS TO THE CONSUMER BASED, AT LEAST IN PART, ON THE CATEGORIZATION OF THE CONSUMER AS A BUSINESS MANAGING CONSUMER OPERATION 211 the seller is granted and/or charged for access to consumers based, at least in part, on the categorization of the consumers as business managing consumers at CATEGORIZE THE CONSUMER AS A BUSINESS MANAGING CONSUMER BASED, AT LEAST IN PART, ON THE IDENTIFICATION OF THE THRESHOLD NUMBER OF TYPICAL BUSINESS RELATED TRANSACTIONS ASSOCIATED WITH THE CONSUMER OPERATION 209.

In one embodiment, an owner and/or operator of a website is a provider of marketing and advertising tools and/or the user of process for identifying business managing consumers 200. In this instance, in one embodiment, at PROVIDE A SELLER ACCESS TO THE CONSUMER BASED, AT LEAST IN PART, ON THE CATEGORIZATION OF THE CONSUMER AS A BUSINESS MANAGING CONSUMER OPERATION 211 the seller is granted and/or charged for access to consumers based, at least in part, on the categorization of the consumers as business managing consumers at CATEGORIZE THE CONSUMER AS A BUSINESS MANAGING CONSUMER BASED, AT LEAST IN PART, ON THE IDENTIFICATION OF THE THRESHOLD NUMBER OF TYPICAL BUSINESS RELATED TRANSACTIONS ASSOCIATED WITH THE CONSUMER OPERATION 209 and the website owner/operator provides the seller advertisement space within the website.

In one embodiment, an owner of a search engine is a provider of marketing and advertising tools and/or the user of process for identifying business managing consumers 200. In this instance, in one embodiment, at PROVIDE A SELLER ACCESS TO THE CONSUMER BASED, AT LEAST IN PART, ON THE CATEGORIZATION OF THE CONSUMER AS A BUSINESS MANAGING CONSUMER OPERATION 211 the seller is granted and/or charged for access to consumers based, at least in part, on the categorization of the consumers as business managing consumers at CATEGORIZE THE CONSUMER AS A BUSINESS MANAGING CONSUMER BASED, AT LEAST IN PART, ON THE IDENTIFICATION OF THE THRESHOLD NUMBER OF TYPICAL BUSINESS RELATED TRANSACTIONS ASSOCIATED WITH THE CONSUMER OPERATION 209 and the search engine owner provides the seller advertisement space within the search engine page and/or in a results section.

In one embodiment, once one or more sellers are provided access to the consumer of CATEGORIZE THE CONSUMER AS A BUSINESS MANAGING CONSUMER BASED, AT LEAST IN PART, ON THE IDENTIFICATION OF THE THRESHOLD NUMBER OF TYPICAL BUSINESS RELATED TRANSACTIONS ASSOCIATED WITH THE CONSUMER OPERATION 209 at PROVIDE A SELLER ACCESS TO THE CONSUMER BASED, AT LEAST IN PART, ON THE CATEGORIZATION OF THE CONSUMER AS A BUSINESS MANAGING CONSUMER OPERATION 211, process flow proceeds to exit operation 230. In one embodiment, at EXIT OPERATION 230, process for identifying business managing consumers 200 is exited to await new data.

Using process for identifying business managing consumers 200, a consumer's financial transaction data is used to identify a given consumer as a business managing consumer. One or more sellers and/or providers of business related products are then given access to that consumer. This is advantageous to both the seller, since the seller is provided access to these desirable consumers, and the consumer, since they are provided offers directly related to their status as a business manager and/or owner.

As discussed in more detail above, using the above embodiments, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "monitoring", "charging", "defining", "searching", "finding", "alerting", "accessing", "analyzing", "obtaining", "deriving", "determining", "collecting", "creating", "identifying", "transferring", "storing", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter.

Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for identifying business managing consumers comprising:

obtaining a consumer's financial data from a computing system implemented personal financial management system, the consumer's financial data being associated with the consumer, the consumer's financial data including data representing one or more financial transactions conducted by the consumer using one or more payment methods; and using at least part of the consumer's financial data to identify the consumer as a business managing consumer.

2. The computing system implemented process for identifying business managing consumers of claim 1, wherein;

obtaining a consumer's financial data using a computing system implemented financial management system comprises obtaining at least part of the consumer's financial data from two or more of the following sources:

a bank;
a debit card account;
a credit union; or
a credit card account.

3. The computing system implemented process for identifying business managing consumers of claim 1, further comprising:

providing a seller access to the consumer based, at least in part, on the identification of the consumer as a business managing consumer.

4. The computing system implemented process for identifying business managing consumers of claim 3, wherein;

providing a seller access to the consumer based, at least in part, on the identification of the consumer as a business managing consumer comprises providing the seller advertisement space.

5. The computing system implemented process for identifying business managing consumers of claim 4, wherein;

providing the seller advertisement space comprises providing the seller advertisement space in one of the following venues:

a website on a network;
a network search engine site;
a computing system implemented application;
a database.

6. A computer program product for providing a process for identifying business managing consumers comprising:

a computer readable medium;
and computer program code, encoded on the computer readable medium, comprising computer readable instructions for:

obtaining a consumer's financial data from a computing system implemented personal financial management system, the consumer's financial data being associated with the consumer, the consumer's financial data including data representing one or more financial transactions conducted by the consumer using one or more payment methods; and using at least part of the consumer's financial data to identify the consumer as a business managing consumer.

7. The computer program product for providing a process for identifying business managing consumers of claim 6, wherein;

obtaining a consumer's financial data using a computing system implemented financial management system comprises obtaining at least part of the consumer's financial data from two or more of the following sources:

a bank;
a debit card account;
a credit union; or
a credit card account.

8. The computer program product for providing a process for identifying business managing consumers of claim 6, wherein;

the computer program code, encoded on the computer readable medium, further comprises computer readable instructions for:

providing a seller access to the consumer based, at least in part, on the identification of the consumer as a business managing consumer.

9. The computer program product for providing a process for identifying business managing consumers of claim 8, wherein;

providing a seller access to the consumer based, at least in part, on the identification of the consumer as a business managing consumer comprises providing the seller advertisement space.

10. The computer program product for providing a process for identifying business managing consumers of claim 9, wherein;

providing the seller advertisement space comprises providing the seller advertisement space in one of the following venues:

a website on a network;
a network search engine site;
a computing system implemented application;
a database.

11. A system for identifying business managing consumers comprising:

a computing system implemented financial management system; and a processor for implementing at least a portion of a process for identifying business managing consumers, the process for identifying business managing consumers comprising:

obtaining a consumer's financial data from a computing system implemented personal financial management system, the consumer's financial data being associated with the consumer, the consumer's financial data including data representing one or more financial transactions conducted by the consumer using one or more payment methods; and using at least part of the consumer's financial data to identify the consumer as a business managing consumer.

12. The system for identifying business managing consumers of claim 11, wherein;

obtaining a consumer's financial data using a computing system implemented financial management system comprises obtaining at least part of the consumer's financial data from two or more of the following sources:

a bank;
a debit card account;
a credit union; or
a credit card account.

13. The system for identifying business managing consumers of claim 11, further comprising:

providing a seller access to the consumer based, at least in part, on the identification of the consumer as a business managing consumer.

14. The system for identifying business managing consumers of claim 13, wherein;

providing a seller access to the consumer based, at least in part, on the identification of the consumer as a business managing consumer comprises providing the seller advertisement space.

15. The system for identifying business managing consumers of claim 14, wherein;

providing the seller advertisement space comprises providing the seller advertisement space in one of the following venues:

a website on a network;

a network search engine site;

a computing system implemented application;

a database.

16. A method for identifying business managing consumers comprising:

obtaining a consumer's financial data from a computing system implemented financial management system, the consumer's financial data being associated with the consumer, the consumer's financial data including data representing one or more financial transactions conducted by the consumer using one or more payment methods;

defining a threshold number of business related transactions required to categorize a consumer as a business managing consumer;

identifying at least the threshold number of business related transactions in the consumer's financial data; and categorizing the consumer as a business managing consumer based, at least in part, on the identification of at least the threshold number of business related transactions in the consumer's financial data.

17. A computer program product for providing a process for identifying business managing consumers comprising:

a computer readable medium;

and computer program code, encoded on the computer readable medium, comprising computer readable instructions for:

obtaining a consumer's financial data from a computing system implemented financial management system, the consumer's financial data being associated with the consumer, the consumer's financial data including data representing one or more financial transactions conducted by the consumer using one or more payment methods;

defining a threshold number of business related transactions required to categorize a consumer as a business managing consumer;

identifying at least the threshold number of business related transactions in the consumer's financial data; and categorizing the consumer as a business managing consumer based, at least in part, on the identification of at least the threshold number of business related transactions in the consumer's financial data.

18. A system for identifying business managing consumers comprising:

a computing system implemented financial management system; and a processor for implementing at least a portion of a process for identifying business managing consumers, the process for identifying business managing consumers comprising:

obtaining a consumer's financial data from a computing system implemented financial management system, the consumer's financial data being associated with the consumer, the consumer's financial data including data representing one or more financial transactions conducted by the consumer using one or more payment methods; and defining a threshold number of business related transactions required to categorize a consumer as a business managing consumer;

identifying at least the threshold number of business related transactions in the consumer's financial data; and categorizing the consumer as a business managing consumer based, at least in part, on the identification of at least the threshold number of business related transactions in the consumer's financial data.

\* \* \* \* \*